April 25, 1967 N. F. HALL ETAL 3,315,985
ACCOUNTING SYSTEMS AND DEVICES FOR PRACTICING THE SAME
Filed Aug. 20, 1965 3 Sheets-Sheet 1
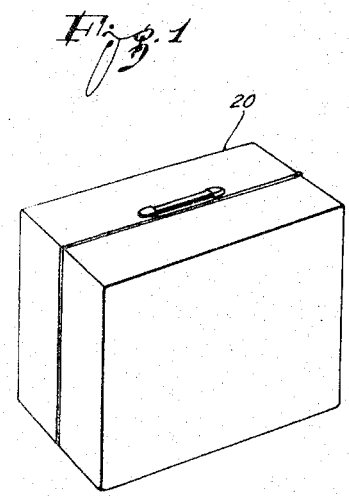
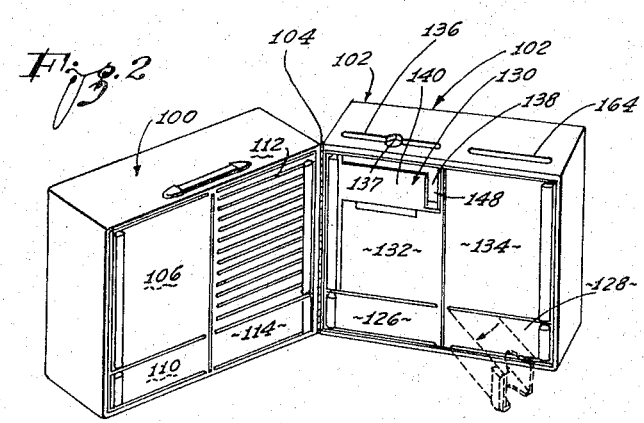
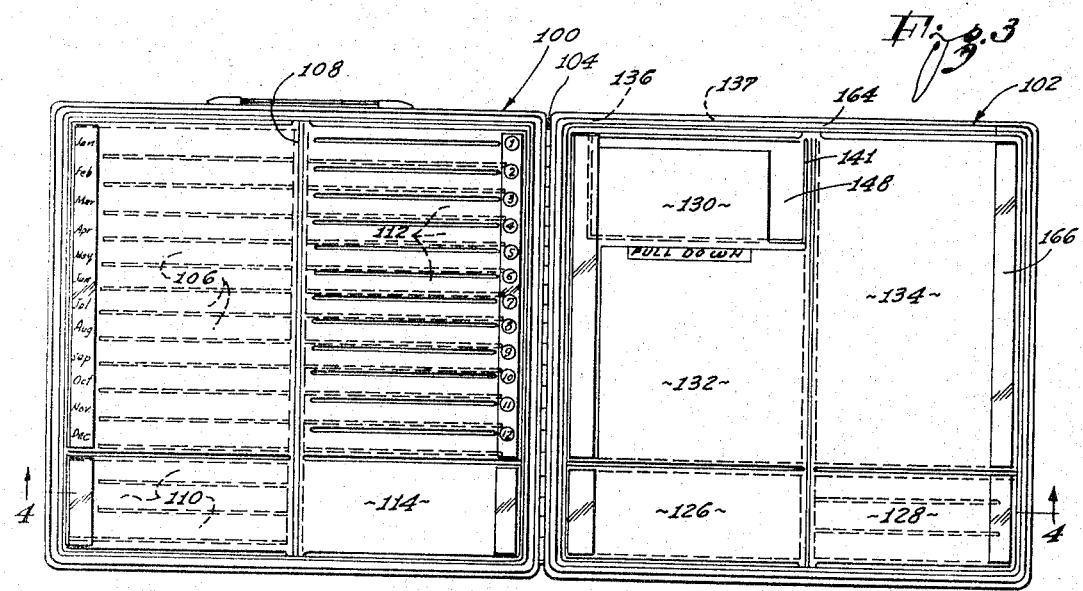
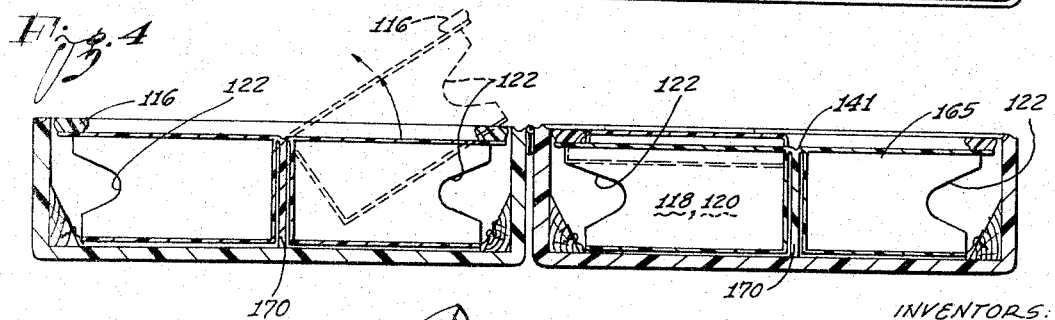
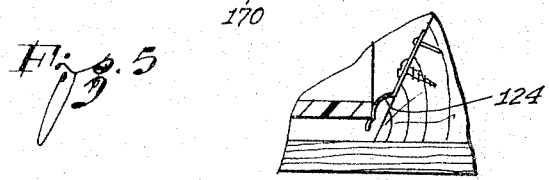
INVENTORS:
Norman F. Hall
Robert E. Bond
Dugald F. Gordon
Attorneys April 25, 1967   N. F. HALL ET AL   3,315,985
ACCOUNTING SYSTEMS AND DEVICES FOR PRACTICING THE SAME
Filed Aug. 20, 1965   3 Sheets-Sheet 2
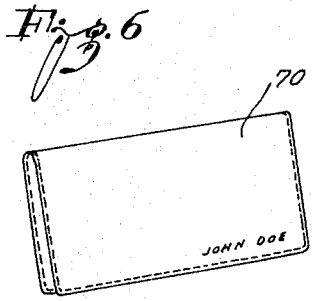
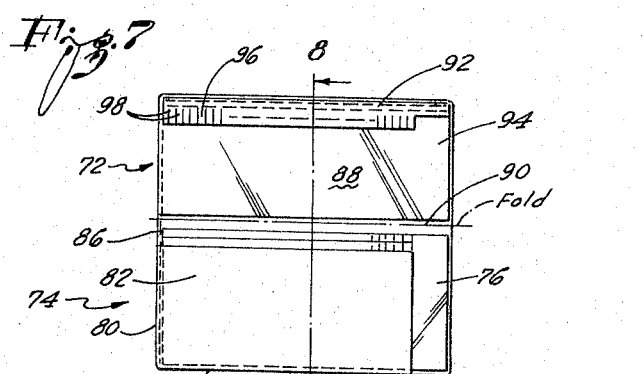
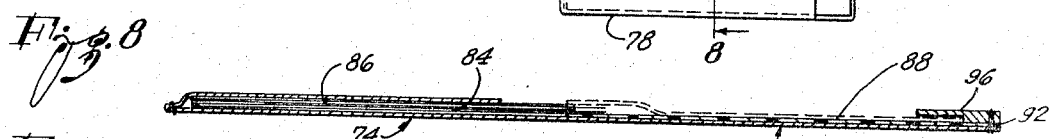
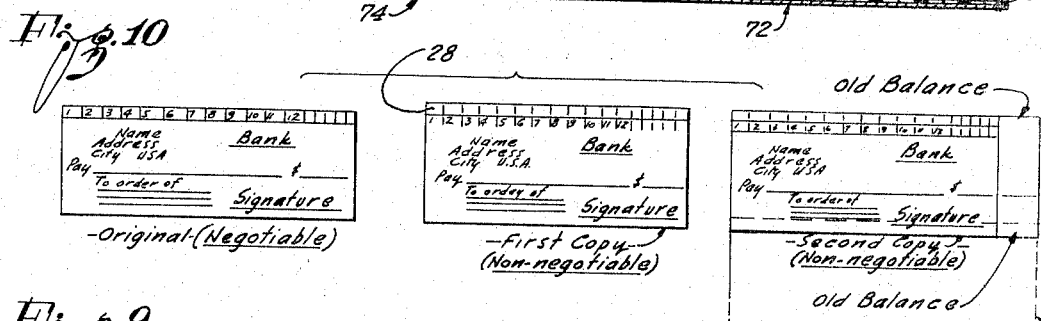
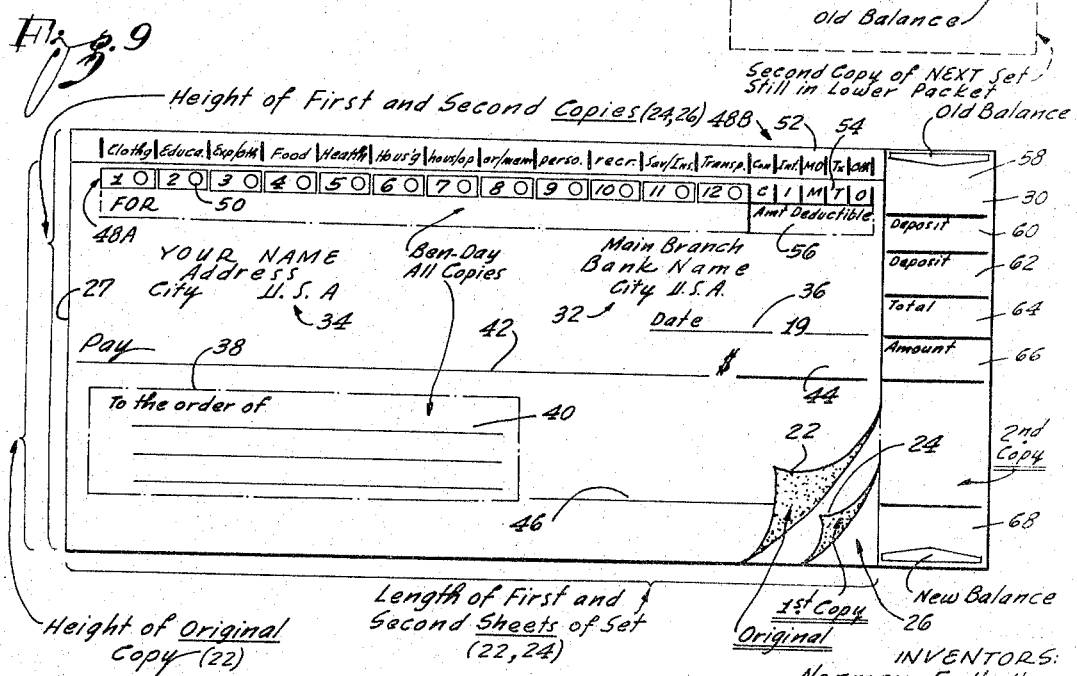
INVENTORS:
Norman F. Hall
Robert E. Bond
Dugald F. Gordon
Attorneys

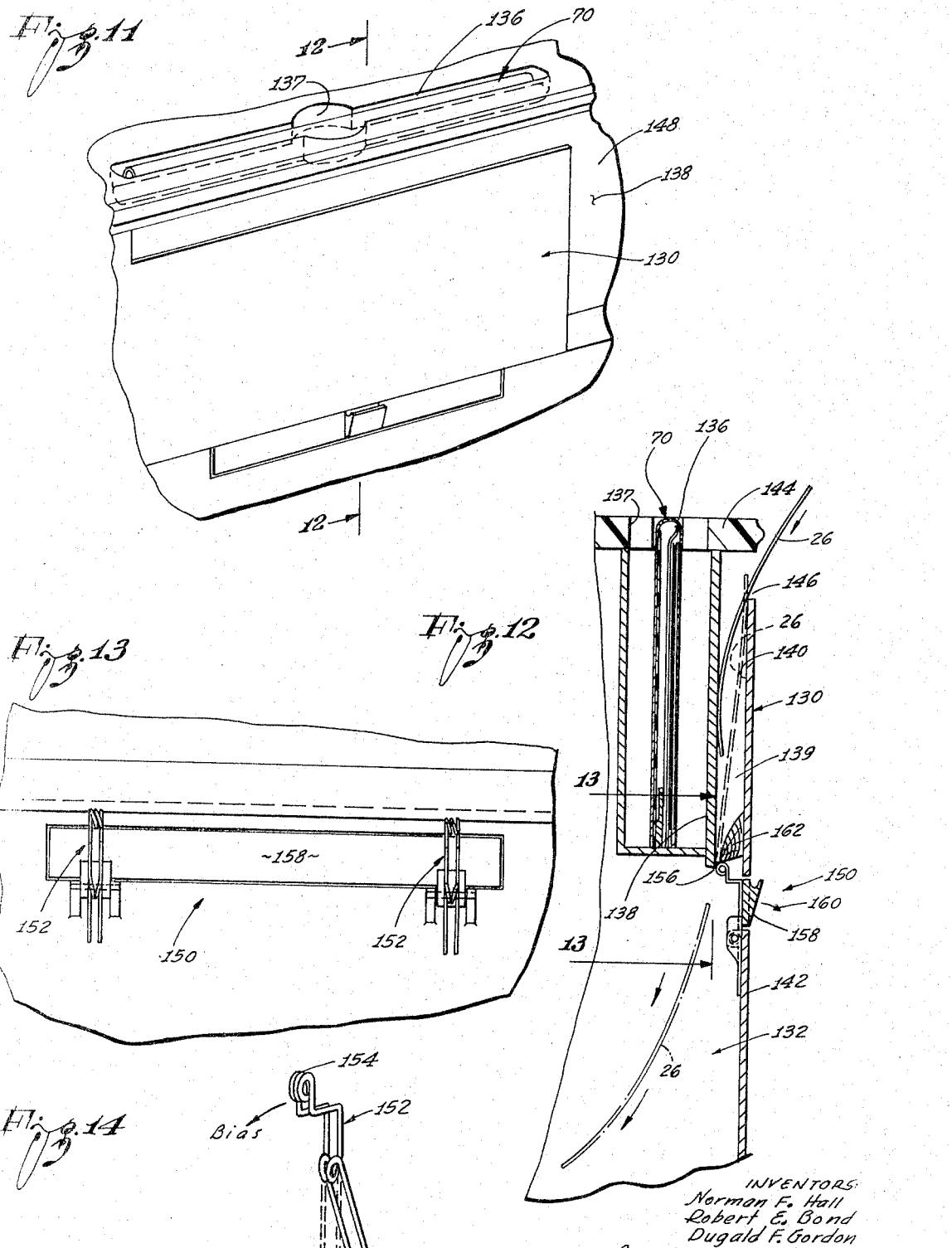

United States Patent Office 3,315,985
Patented Apr. 25, 1967

3,315,985
ACCOUNTING SYSTEMS AND DEVICES FOR PRACTICING THE SAME
Norman F. Hall, 1625 Chelsea Road, San Marino, Calif. 91108; Robert E. Bond, 1614 Poppy Peak Drive, Pasadena, Calif. 91105; and Dugald F. Gordon, 1740 Meridian, South Pasadena, Calif. 91030
Filed Aug. 20, 1965, Ser. No. 481,332
7 Claims. (Cl. 282—23)

This invention relates to accounting systems in general, and in particular, to an accounting system which is especially adapted for use by an individual in keeping and controlling his household accounts. The invention includes certain devices which are designed to enable an individual to practice the accounting system herein described. These devices include a multiple copy check, a holder for containing a supply of such checks and for issuing the same, and a special container adapted to receive the check holder and enable the person who issues the checks to file copies of issued and cancelled checks, deposit slips and bills in such a way that he may be able to determine quickly the state of his household finances and more readily control the expenditures of himself and his spouse.

The average person who maintains a checking account, upon which he draws checks to pay his household and other bills, frequently finds that, despite care in making entries and in issuing checks, his account does not reconcile with his monthly bank statement for any of a number of reasons. He may also encounter such problems as the mislaying of bills so they are not paid when they should be, and whether and when certain bills were paid. In addition, there is always the annual hunt for "tax deductibles" and proofs thereof. Also, one is usually faced with the problem of filing and storing all checks, deposit slips and bills for a certain period. Most importantly, however, unless an elaborate budget accounting sheet is set up, maintained and checked by the householder, he will frequently find that many of his expenditures have exceeded what he had at least mentally budgeted for them, and he may not find this out until he is in some financial difficulty.

The system of the present invention has been devised to obviate such difficulties and problems encountered by the average householder who attempts to bank his money and pay his bills through a standard checking account. This system is predicated upon the use of a novel multiple copy check upon which may be printed spaces for various types of accounting information—the spaces being filled in by the writer at the time the check is issued. The original of the check which is actually issued to the payee preferably contains only coded areas upon which the accounting information may be marked at the time the check is written. The two copies of the check are dimensioned to provide extensions of these coded areas on which extensions may be printed explanations of markings in the coded area of the original of the check; and the second copy includes a further extension in which a running account may be kept—this being accomplished by adding deposits and deducting the amount of the issued check from the last balance. The checks and their copies are preferably printed on chemically treated paper which require no carbon paper to impress simultaneously upon the first and second copies any writing marked upon the original of the check.

The check holder is not only designed to conveniently carry a supply of checks, but also to provide a hard surface upon which the householder may write his check, and to dispose the check being written upon in such a manner whereby the balance entered upon the second copy thereof simultaneously appears upon the extension of the second copy of the check next to be issued.

The third device which is required to enable one to practice the inventive system is a double box-like container consisting of two sections hinged together to close into one complete unit: One section is provided with a series of compartments—preferably one for each month—into which cancelled checks are inserted when they are returned by the bank with the bank statement; this section preferably also includes a further series of compartments to hold copies of deposit slips and a fresh supply of the same; and a third series of compartments, one of each account and tax deductible category, into which are inserted the first copies of the checks as the same are issued. The other of the two sections of the box-like container may be compartmented to hold the second copy of the checks in numerical order of issuance, bills to be paid and the check holder itself.

The inventive system and devices for practicing the same are more fully explained in the following detailed specification in reference to the accompanying drawings in which, FIGURE 1 is a perspective view of the container;
FIGURE 2 is a perspective view of the container of FIGURE 1 in opened position;
FIGURE 3 is a side elevation of the two sections of the opened container;
FIGURE 4 is a section taken on the line 4—4 of FIGURE 3;
FIGURE 5 is a detail of the structure for holding against the container wall one of the hinged compartments showing in FIGURE 4;
FIGURE 6 is a perspective view of the check holder;
FIGURE 7 is a side elevation of the check holder in opened position;
FIGURE 8 is a section taken on the line 8—8 of FIGURE 7;
FIGURE 9 is a plan view of the preferred embodiment of the multiple copy check;
FIGURE 10 is a laterally exploded view of the check of FIGURE 9;
FIGURE 11 is a detail of the check holder compartment of FIGURES 2 and 3;
FIGURE 12 is a section taken on line 12—12 of FIGURE 11;
FIGURE 13 is a section taken on line 13—13 of FIGURE 12; and
FIGURE 14 is a detail of the spring element shown in FIGURES 12 and 13.

The system of the present invention may be conveniently practiced by utilizing the container 20 which is illustrated in FIGURES 1–5 and 11–14, in conjunction with the multiple copy check, illustrated in FIGURES 9 and 10, and the check holder, illustrated in FIGURES 6–8 of the drawings. Since the entire system is predicated upon the use of a multiple copy check, any detailed explanation of the system should start with a full description of the preferred embodiment of such check aspect of the invention.

The check disclosed in FIGURES 9 and 10 of the drawings is preferably comprised of an original 22, a first copy 24 and a second copy 26, all bound together along their left edges 27, but removable from each other by a tearing motion across such edges 27. The first copy 24 overlies the second copy 26, and the original 22 overlies the first copy 24. The first and second copies 24, 26 are printed similarly to the original 22 and are disposed in registry therewith. Although carbon paper could be employed with the two copies of the check, in the preferred embodiment of the check either the backs of the original and each of the two copies, or the faces of the two copies are chemically treated in a manner now well known in the art to react to writing pressure applied to the original 22 to duplicate the writing on the first and second copies 24, 26. Paper so treated is sold under the trademark "Action" by Minnesota Mining and Manufacturing Company, of St. Paul, Minn., and under the trademark "NCR" by National Cash Register Company of Dayton, Ohio. Both the first and second copies 24, 26 of the check are greater in width than the original 22 by the extension strip 28, and the second copy 26 is greater in length than the first copy 24 by the extension strip 30.

The printing on the original 22 may be standard check printing 34 insofar as concerns the name and address 32 of the bank upon which the check is drawn, the name and address 34 of the drawer of the check, the space for dating 36, the order to pay 38 and spaces 40, 42, 44, 46 for the named payee and his address, the dollar amount in writing and in figures and signature line. It is contemplated that the original of the check may be inserted in a double window envelope (not shown), so that the name and address of the payee 40 and of the drawer 34, both of which appear on the check, will be visible through the windows of the envelope. Thereby the check writer may avoid having to separately address the envelope in which the check is sent through the mails. Envelope-check combinations of this type have been in public use prior to the present invention and form no part of the present invention.

In addition to such standard printing on the check, the original and copies of the check of the present invention are further printed, preferably across the top edge with two series of boxes 48A and 48B. Certain of these boxes 48A, as shown in FIGURE 9, are numbered and include small circles 50 for marking by the check writer in the manner hereinafter explained. The other series of boxes 48B are labelled "Amt Deductible" and "C,I,M,T,O" and are also intended to be filled in by the check writer at the time he issues the check. What each of these boxes represents is explained by the label 52 which appears just above the box 48A or 48B on the first copy of the check (and similarly on the second copy). Each label designates one of a series of household accounts, one of which is applicable to each particular check, or a type of tax deduction in the case of the 48B boxes. The reason why the label is not placed on the original of the check is to avoid disclosing to the payee the particular account category against which the drawer of the check may mark as the one against which he is charging the particular check issued to such payee. However, the check drawer or writer may enter a description of the item or service for payment of which he is issuing the check in the blank space 54 disposed below the series of boxes 48A. Additionally, he may enter what he regards as the amount properly deductible for tax purposes in the blank space 56 under the words "Amt Deductible."

Since everything which is printed upon the original of the check also appears upon the first and second copies 24, 26, and since the copies, through the chemical treatment of the paper, as heretofore described, duplicate everything written upon the original, it may be seen that after the original of the check is written and removed from the first and second copies 24, 26, the latter contain all information on the original, and in addition, labels for the account catergories one or more of which will have been marked by the check writer when he wrote the original. The second copy includes even more information—namely, a running account which is brought up-to-date at the time the check is written. Thus, on the right hand strip 30 which extends beyond the area of the first copy, a space 58 is provided for the last account balance; below that, two spaces 60, 62 for entering any deposits, a further space 64 for a total including deposits, a space 66 parallel to figure dollar amount of the check entered at 44 in which such dollar amount is also entered, and a new balance space 68 in the lower right hand corner of the second copy.

In order to enable the writer of the checks of the present invention to carry and issue them more conveniently, we have provided a novel check holder 70. This check holder preferably may be folded over in the mannear of a wallet, as shown in FIGURE 6. However, when it is opened, as shown in FIGURES 7 and 8, it includes an upper section 72 and a lower section 74. The lower section 74 is constructed of the lower half of a flexible backing over part of two edges of which 78 and 80 are stitched or otherwise secured to a flap 82. This flap extends only about three-quarters of the length of the checks, and with the lower half 76 of the backing constitutes a pocket 84 into which may be inserted a plurality of the multi-copy checks 86 heretofore described. The upper section 72 is likewise formed by the upper half 88 of the backing which is preferably integral with the lower half 76, but foldable along a line 90. Secured to the upper edge 92 of the portion 88 of the backing is a relatively rigid flat plate-like element 94 which serves as a hard surface support upon which one may write. Also secured along said edge 92 is a positioning strip 96 which may be of the configuration shown in FIGURES 7 and 8.

In use, when it is desired to write a check on the check holder, one of the plurality of checks 86 is removed from the pocket 84 and its upper edge inserted between the positioning strip 96 and the rigid element 94. It may be seen that when the check is so inserted the lower edge thereof extends down over the upper edges of the checks which have been left in the pocket 84. Consequently, when the new balance is written upon the second copy of the check at the time the original is being filled in, there is simultaneously entered the amount of this balance as the old balance at the top of the next check to be withdrawn from the pocket.

The positioning strip 96 also includes at 98 all of the account labels which appear on the first and second copies 24, 26 of the check. It is, therefore, a simple matter for the check writer to look at the labels which appear on the positioning strip and mark in the proper circle 50 or the box 48A, 48B on the original of the check, to indicate the account category which he feels the check should be charged against, and, if appropriate, the tax deductible account.

Having described the multiple copy check and check holder which are preferably used in the accounting system of the present invention, we will now give consideration to the special account container 20, which is illustrated in FIGURES 1-5 and 11-14. In the prefered embodiment so illustrated, this container is comprised of two half sections 100, 102. These half sections, which are box-like in configuration and equal in dimensions, are hinged together along abutting edges 104. The lefthand section 100 is provided with a first series of compartments, each of which is hinged along the line 108 so as to be capable of being swung out from such hinge line sufficiently to permit a person to insert or remove checks in each of the compartments 106. The latter compartment are provided to receive cancelled checks returned by the user's bank at the end of each month. Below the series of compartments 106 are several additional compartments 110 in which may be stored copies of bank deposit receipts, forms, passbook, etc. The right half of section 100 includes a further series of compartments 112. These are likewise hinged about the line 108, but move in an oppositely directed arc from the arc of swing of the compartments 106. One of these compartments 112 is provided for each of the account categories which are labelled on the first and second copies 24, 26 of the check, along the upper edges thereof. Each of these compartments 112 is intended to receive the first copy 24 of each issued check which is applicable to that particular account so marked on the check. In the lower righthand corner of the section 100 may be provided a large compartment 114 for the storage of mailing envelopes, stamps, etc. It may be seen from FIGURES 4 and 5 that each hinged compartment 106, 110, 112 and 114 is provided with some handle means 116, whereby the same may be grasped in order to pull the free end of the compartment so that the entire compartment will pivot about its hinge line 108. Further, the configuration of the top and bottom walls 118, 120 of each compartment preferably is such as to provide an indentation or cutaway area 122 in order to facilitate the removal of checks or check copies and other rectangular papers from each compartment. In order that the compartments will remain closed unless withdrawn by means of the handle 116, some spring-loaded locking or detent means, such as that illustrated in FIGURE 5 at 124 should be constructed in the wall of the boxlike housing.

The rihgthand section 102 is, as has been indicated, symmetrical in its external configuration with that of the lefthand section 100 and does, moreover, include certain similar compartmentation such as 126 and 128. Compartment 126 may be utilized to contain pads of blank check units from which groups of checks may be removed for insertion in the check holder 70, and in the several compartments 128 may be stored income records, a manual explaining the system, and a bank service guide.

The righthand section 102, however, contains several different types of compartments from those which have been described as being incorporated in the lefthand section. These several different compartments include a compartment 130 which serves to receive and retain for ready removal the check holder 70; a storage compartment 132, which serves to receive the second copies of the checks in numerical sequence; and a bill receiving compartment 134.

This compartment 130 is narrow and just deep enough to accommodate the folded checkholder 70. Access to the check holder compartment 130 is afforded by a slot 136, which is preferably widened at its midsection 137 to permit the user to insert two fingers to withdraw the check holder 70 from the slot 136. The forward wall 138 defining the check holder compartment 130 also constitutes the back of a passage 139 through which second copies 26 of the checks as issued may be deposited in numerical order of issuance into the storage compartment 132.

The compartment 132 is located directly below the check holder compartment 130 but, in contrast to the latter which is fixed in position, may be swung outwardly about the vertical axis 141 to permit removal of its contents from its left side, in a manner similar to the compartments 112. The passage 139 into storage compartment 130 is further defined by a forward wall 140, which lies in the same plane as the forward wall 142 of the compartment 132, but does not extend all the way to the transverse box wall 144, thereby leaving a slot 146 through which second copies of checks may be inserted into passage 139. The wall 140 further does not extend all the way to the hinge line or vertical axis 141, but leaves an opening or window 148 on the right side.

Removable means 150 are provided to temporarily obstruct the lower portion of the passage 139. This means may take any of a number of forms, but in FIGURES 12–14, there is shown one form of such an obstruction which is suitable for the purpose intended. A pair of projecting elements 152 are pivotally attached to the inside of the wall 142 and are spring biased to provide a light contact by the coil projection 154 of the element against the lower edge 156 of the wall 138. The spring elements 152 are attached to a bar 158 which may be pulled outwardly in the direction of the arrow 160. The lower portion of the passage 139 is provided with a fixed guide member 162 which is shaped to direct the lower ends of inserted second copies of checks to the points of contact between the coils 154 and the wall edge 156.

From the foregoing description of the compartment 132, the passage 139 and the bar operated elements 152, it will be appreciated that as each second copy 26 of an issued check 24 is inserted in the slot 146, it drops into the passage 139 where its further progess toward the compartment 132 is arrested by the coils 154 which are in contact with the wall edge 156. In this position, the running account on the righthand side of this second copy of the check is exposed to view through the opening or window 148. The person using the system may then see the balance according to the last issued check. When he issues another check, he will wish to put in the slot 146 the second copy of the same, but first he will cause the second copy of the previous check to drop down into the compartment 132 by pulling the lever bar 158 to move the coils 154 out of contact with the wall edge 156 and thereby temporarily remove the obstructions in the lower area of the passage 139. The check copy which has been held in passage 139 then drops down into the compartment 132 to come to rest upon the last second copy 26 which had followed the same course.

The remaining compartment 134, which is intended for receiving and storing bills, is generally similar in construction to that of compartment 132, although it is not provided with an obstructible passage of the type of 139. Instead, access to compartment 134 for depositing bills to be paid is afforded by a simple slot 164. No upper transverse wall is provided to the walled unit 165, which is hinged along the line or axis 141 and swings outwardly from the right side of the section 102 about such axis, and with the fixed walls of the box section 102, defines the compartment 134. Therefore, any papers inserted through the slot 164 drop to the bottom of the compartment, or upon other papers which may have fallen into the same through previous insertions. When it is desired to remove any of these thus deposited bills or invoices, the handle 166 is pulled outwardly so that the hinged unit 165 swings about the axis 141 thereby exposing the righthand open end of the unit 165. Desirably the unit 165, as well as all other hinged compartments in the container 20, are molded of a flexible plastic material which permits limited movement of each unit or compartment about a vertical axis disposed on the forward edge of a molded center wall 170, in the manner of a hinge. Plastic materials suitable for such a construction are well known in the art and do not constitute, as such, any part of the present invention. Other suitable hinging devices or materials may be substituted to accomplish the same purpose.

From the foregoing description of the several devices which have been especially designed to enable the system of the present invention to be conveniently practiced, it may be readily appreciated that the system involves issuing multiple copy checks of the type heretofore described and appropriately marked to indicate to which one of a series of predetermined accounts the check is to be charged; storing the first copy of the check in a compartment maintained for the particular account marked on the check; storing the second copy of the check in a compartment maintained for numerical order storage of such second copies; storing the original, upon return by the bank, in a compartment for a preselected time period; and keeping a running balance on the second copy of each check as issued.

The user of this system places himself in an excellent position to control the amount of expenditures which he makes by his check issuances in each account category. Should he find that he is exceeding the amount which he has budgeted for any particular account category, the user may take immediate steps to limit further expenditures of this nature. Further, by examining his second copies of the checks which are kept in numerical order in compartment 132, he may ascertain quickly what checks he has issued. When his cancelled checks are received monthly from his bank, the system user may, by comparing them with the filed second copies, readily determine what checks have not yet been cashed and effect a reconciliation with his check balance.

What particularly appeals to many people about the system of the present invention is that it saves considerable time in paying bills since it is unnecessary to make duplicate entries in the stubs of checkbooks and to try to keep one's accounts through these stubs. Not infrequently it will be found that the check writer will make a different entry in the stub from what he has written on the check. This possibility of error is eliminated by the system and checks of the present invention, since the payee's name, as written on the check, is simultaneously duplicated on the copies, and the place for writing the amount in figures in the running account on the edge of the second copy is located immediately adjacent the place for entering the amount on the check. Such disposition enables the check writer to effect a better visual comparison and thereby eliminate errors.

Further, it will be seen that tax deductibles will have been noted throughout the entire year so that it becomes a relatively simple matter for the individual to collect them at the time he is required to prepare and file his income tax returns.

In addition, the several devices which have been described provide a conveniently housed compact accumulation of all items which are required to pay household bills through a checking account. Thus, there is avoided having the checkbook in one place, the bills piled up on a table or desk, the bank statements and cancelled checks somewhere else, and deposit slips, bank forms, bank deposit book and other pertinent items scattered in other locations about the house.

Other advantages of the system and several devices heretofore described for practicing the same will be found by those using the same. While we have described and illustrated the preferred embodiment of our invention, variations in the arrangements of the checks, the check holder, and the container will readily occur to persons skilled in the art. Thus, the system and devices may be readily adapted to providing account control for others than householders, as for example, students, professional people, single persons, small businessmen and farmers. For each the account designations may be different and the various devices modified to accommodate their particular needs. Further, in lieu of having the extended areas in first and second copies of the check, the original and the two copies could be of the same size with the first and second copies being printed to provide further information than is found on the original, such as account categories, space for keeping a running account, etc. All such variations, however, are intended to be comprehended within the scope of the present invention.

What is claimed is:
1. In a multiple-copy check, the combination of:
an original check having upper and lower faces, first and second longitudinal edges, and first and second transverse edges, said original check being issuable to a selected payee;
a first non-negotiable check underlying said original check in registry therewith, said non-negotiable check having an upper face confronting said lower face of said original check and a lateral extension extending laterally beyond said first transverse edge of said original check, said lateral extension providing sufficient area for maintaining a running account of the status of the account from which the original check is drawn;
means in registry with said original check and said non-negotiable check for transferring information impressed on said upper face of said original check to said upper face of said non-negotiable check; and
said original check having a plurality of encoded account category designations disposed along one of said edges thereof other than said first transverse edge.

2. A combination as defined in claim 1 including a second non-negotiable check in registry with said original check and means in registry with said original check for transferring information impressed on said upper face of said original check to said second non-negotiable check.

3. A combination as defined in claim 2 wherein one of said non-negotiable checks has a second extension extending beyond said one edge of said original check, said second extension having decoding designations therealong corresponding to the encoded account category designations whereby the user of the multiple-copy check can readily visually ascertain the meaning of each of said encoded account category designations.

4. A combination as defined in claim 1 including an accounting container having a series of compartments therein, each of said series of compartments being designated to correspond to one of said account category designations on said original check.

5. In combination:
a multi-copy check including an original issuable to a selected payee and first and second copies for retention by the check writer, said second copy having an area greater than the total area of each of the original and first copy and an edgewise lateral extension on which a running account of prior balance, deposits, and the amount of the check may be kept to enable the drawer of the check to have up-to-date knowledge of the status of the account on which the check is drawn, including its balance after deducting the amount of the check, said first copy of the check being superimposed on the second copy in registry therewith, the original being similarly superimposed upon the first copy, and reproduction means in association with the contacting faces of said original and said first and second copies of each check whereby writing impressed on the original is simultaneously duplicated upon corresponding areas of the first and second copies of the check; and
means for holding and utilizing a plurality of said multiple-copy checks including a backing adapted to be laid flat to provide an upper area and a lower area, the lower area including a pocket for a preselected number of the checks, said pocket being of such configuration as to expose the edgewise lateral extension of the copy of the check on which the running account is kept, the upper area being provided with a hard surface adapted to support a check when it is being written upon, and positioning means adapted to position the check being written upon so that the lower area of the edgewise lateral extension thereof overlies the upper edge of the next check to be used which is contained in the pocket.

6. A combination as defined in claim 5 wherein the positioning means includes a strip disposed along the upper edge of the backing and partially separated therefrom and said strip contains an indication of a plurality of categories of accounts.

7. A combination as defined in claim 5 including reproduction means in association with the lower edge of the edgewise lateral extension whereby any writing of the account balance on a check placed in the positioning means of said means for holding and utilizing is simultaneously duplicated at the top of the edgewise lateral extension of the top check deposited in the pocket for subsequent use in the positioning means.

(References on following page)

References Cited by the Examiner

UNITED STATES PATENTS

| | | | |
|---|---|---|---|
| 1,184,285 | 5/1916 | Ward | 283—58 |
| 1,222,037 | 4/1917 | Schwander | 283—58 |
| 1,546,259 | 7/1925 | Scroth | 283—66 X |
| 1,587,242 | 6/1926 | Rumely | 283—58 |
| 2,406,267 | 8/1946 | Tambert | 282—22 |
| 2,536,371 | 1/1951 | Hutchison | 283—58 X |
| 3,048,426 | 8/1962 | Rodriguez et al. | 283—23 |
| 3,147,991 | 9/1964 | Heinz | 282—23 |

FOREIGN PATENTS

| | | |
|---|---|---|
| 722,342 | 7/1942 | Germany. |

LAWRENCE CHARLES, *Primary Examiner.*